United States Patent [19]

Coventry

[11] 4,171,687
[45] Oct. 23, 1979

[54] REVOLUTION LIMITERS

[75] Inventor: Mark Coventry, La Colline, France

[73] Assignee: Lumenition Limited, London, England

[21] Appl. No.: 774,951

[22] Filed: Mar. 7, 1977
(Under 37 CFR 1.47)

[30] Foreign Application Priority Data

Mar. 5, 1976 [GB] United Kingdom ............... 9020/76

[51] Int. Cl.² .......................................... F02P 9/00
[52] U.S. Cl. .................................. 123/118; 123/102; 123/198 DC
[58] Field of Search ............... 123/118, 102, 198 DC, 123/198 DB

[56] References Cited

U.S. PATENT DOCUMENTS

| | | | |
|---|---|---|---|
| 3,563,219 | 2/1971 | Mieras | 123/118 |
| 3,581,720 | 6/1971 | Hemphill et al. | 123/102 |
| 3,665,903 | 5/1972 | Harris et al. | 123/118 |
| 3,675,036 | 7/1972 | Davies | 123/148 S |
| 3,762,383 | 10/1973 | Richards et al. | 123/102 |
| 3,776,204 | 12/1973 | Harris | 123/118 |
| 3,854,465 | 12/1974 | Adams | 123/117 R |
| 3,858,563 | 1/1975 | Roth | 123/118 |
| 3,884,203 | 5/1975 | Cliffgard | 123/118 |
| 3,919,993 | 11/1975 | Neuman | 123/148 E |
| 3,967,604 | 7/1976 | Kondo | 123/118 |

*Primary Examiner*—Charles J. Myhre
*Assistant Examiner*—Andrew M. Dolinar
*Attorney, Agent, or Firm*—Larson, Taylor and Hinds

[57] ABSTRACT

A revolution limiter for internal combustion engines having a circuit for detecting when the engine revolutions exceed a given maximum permitted value, and a circuit for limiting the voltage on the primary winding of the coil comprising a semiconductor device which will breakdown above a given threshold voltage and a semiconductor switch connected in series between the terminal of the primary winding remote from the positive line connection and ground, the semiconductor switch being rendered conductive by the detection circuit in order to limit the voltage on the primary winding of the coil and thus prevent a spark occurring when said given limit is exceeded.

7 Claims, 4 Drawing Figures

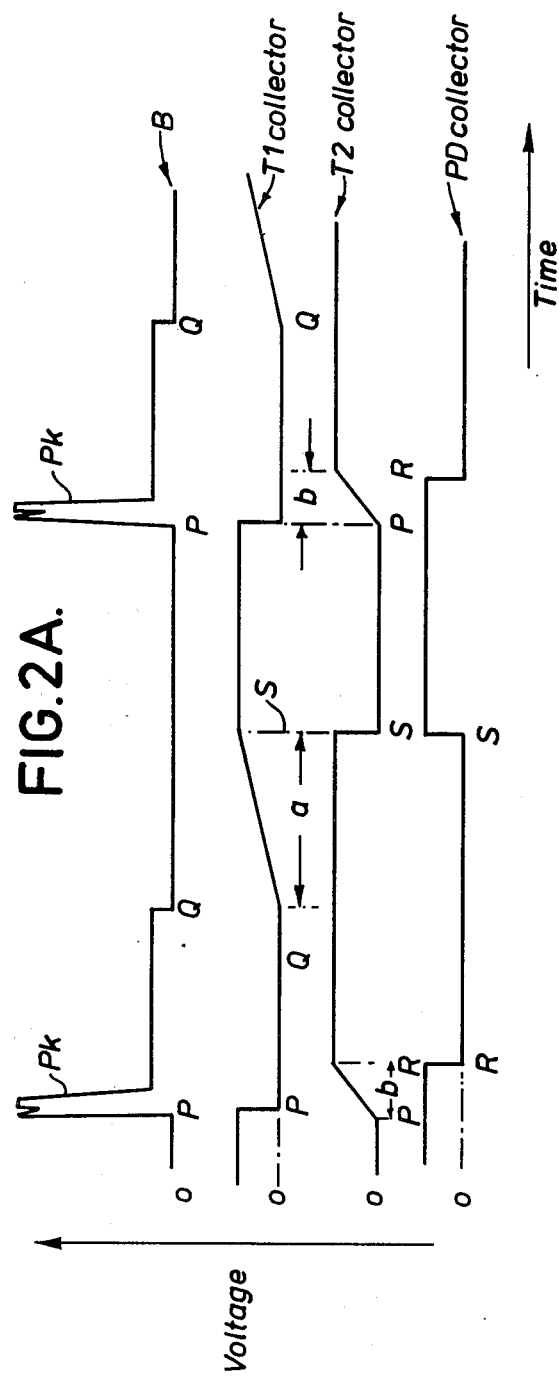

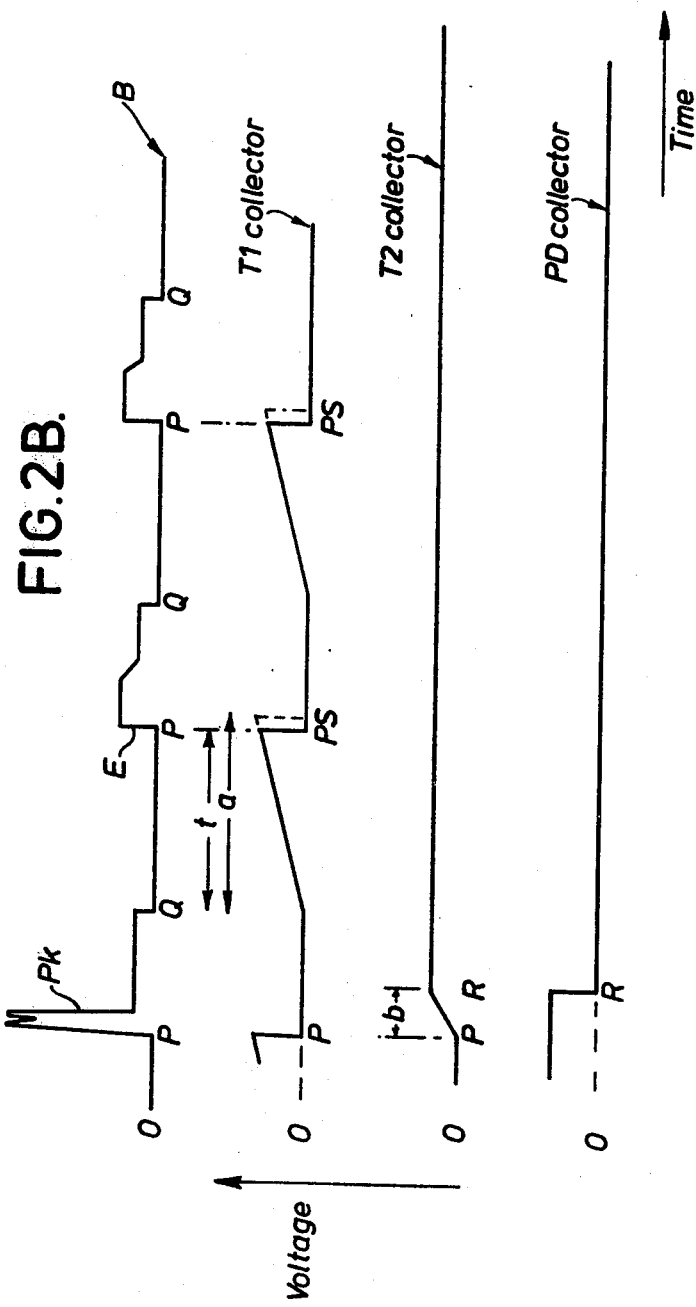

REVOLUTION LIMITERS

FIELD OF THE INVENTION

The present invention relates to revolution limiters for internal combustion engines having spark ignition.

DESCRIPTION OF THE PRIOR ART

It is well known that an internal combustion engine, in which combustion is produced by means of a spark, can be prevented from exceeding a given number of revolutions per minute by earthing the coil terminal until the speed has dropped below the permitted maximum.

It is, however, a common fault of known revolution limiters that when the ignition is restored by removing the "ground" from the coil terminal, a falsely timed spark can occur if the contact breaker (in the case of a conventional ignition system) or the power device (in the case of an opto-electronic ignition system) is open or off respectively, at the moment of the ground connection is removed.

SUMMARY OF THE INVENTION

It is an object of the present invention to partially or wholly overcome the above disadvantage.

According to the present invention, there is provided a revolution limiter for an internal combustion engine having spark ignition, including means for detecting when the engine revolutions exceed a given maximum permitted value, and means for limiting the voltage on the primary winding of the coil, only if there is present a voltage in the primary winding which exceeds a given voltage value which is higher than the battery or line voltage.

Preferably, the means for limiting the voltage on the primary winding of the ignition coil includes a zener diode or other semiconductor device, which will breakdown above a given threshold voltage, and a semiconductor switch in series between the terminal of the primary winding remote from the positive line connection and ground. The semiconductor switch is preferably a power Darlington pair.

In the case where the ignition system is used with a 12 volt battery, the zener diode may have a breakdown voltage of 20 volts.

BRIEF DESCRIPTION OF THE DRAWINGS

The present invention will now be described in greater detail, by way of example, with reference to the accompanying drawings, wherein:

FIG. 2A shows waveforms at various points in the circuit of the revolution limiter of FIG. 1, when the engine speed is low and the limiter is not limiting;

FIG. 2B shows the corresponding waveforms when the limiter is just limiting.

DESCRIPTION OF THE PREFERRED EMBODIMENTS

Figure 1:
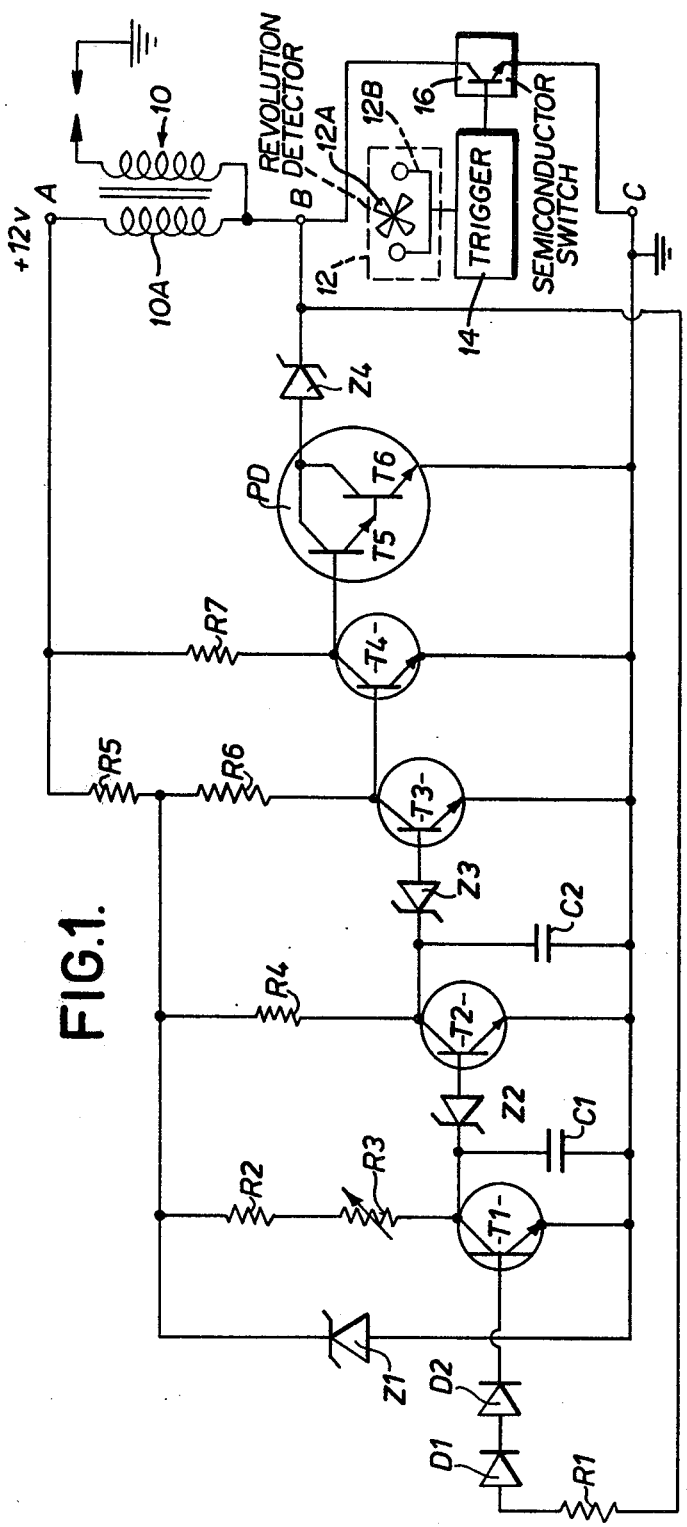
FIG. 1 is a circuit diagram of a first embodiment of a revolution limiter for an internal combustion engine having spark ignition.

Referring first to FIG. 1, the circuit of the revolution limiter includes: transistors T1 to T4; a power Darlington pair PD consisting of transistors T5 and T6; resistors R1 to R7; zener diodes Z1 to Z4; diodes D1 and D2; and capacitors C1 and C2.

The circuit has three terminals A, B and C, the terminals A being connected to a line voltage supply, the side of the terminal B to the primary winding 10A of the ignition coil 10 remote from the positive line and the terminal C to ground. An engine speed detecting and semiconductor switch arrangement connected between terminals B and C comprises a revolution detector 12 including a shaft-mounted shutter indicated at 12A and an optico-electrical transmitter and receiver indicated at 12B; a trigger 14; and a semiconductor switch 16.

The base electrode of the transistor T1 is connected to the terminal B through the resistor R1 and the diodes D1 and D2. The collector electrode of the transistor T1 is connected to the base electrode of the transistor T2 through the zener diode Z2, while the capacitor C1 is connected across the emitter and collector electrodes of the transistor T1.

Likewise, the collector electrode of the transistor T2 is connected to the base electrode of the transistor T3 through the zener diode Z3, the capacitor C2 being connected across the emitter and collector electrodes of the transistor T2. The collector electrode of the transistor T3 is connected directly to the base electrode of the transistor T4, and likewise the collector electrode of the transistor T4 is connected directly to the base electrode of the transistor T5, which is the first component of the power Darlington pair PD.

The emitter electrodes of all transistors T1 to T4 and T6 are connected directly to ground. The power supply for the transistors T1 to T3 is obtained across the zener diode Z1 and stabilized at 7.5 volts, the zener diode being connected to the terminal A via the resistor R5. The resistors R2; R3; R4; R6 and R7 are respectively connected in the collector circuits of the transistors T1 to T4.

The zener diode Z4 is connected between the terminal B and the commoned collector electrodes of the power Darlington pair PD and has a breakdown voltage of 20 volts, and will thus conduct positive voltages in excess of 20 volts through the power Darlington pair PD when it is conductive.

The switching of the power Darlington pair PD is controlled by the pulses produced at the terminal B by the semiconductor switch 16 (or a contact breaker) connected in series with the primary winding of the ignition coil. The pulses are fed to the base of the transistor T1 via the resistor R1 and diodes D1 and D2. The diodes D1 and D2 raise the threshold voltage for switching transistors T1 above the saturated voltage of the power device of any electronic ignition system.

Consider first the low speed non-limiting operation. FIG. 2A shows the voltages at the terminal B, and on the collector electrodes of the transistors T1, T2 and the power Darlington pair PD. At the point P, the voltage at the terminal B is substantially zero. Transistor T1 is OFF, transistor T2 is ON, transistor T3 is OFF, transistor T4 is ON, and power Darlington pair PD is OFF. The voltage peak PK then appears at the terminal B, and switches ON the transistor T1, which switches OFF the transistor T2 with negligible delay. The capacitor C2 then charges up via the resistor R4 for a time b until the voltage on it exceeds the breakdown voltage of the zener diode Z3 plus the turn on voltage of the transistor T3. The transistor T3 then switches ON at the point R, switching OFF the transistor T4, and consequently, switching ON the power Darlington pair PD with negligible delay. The delay time b must be greater than the duration of the voltage peak PK in order that no energy is absorbed from the peak under normal operating conditions. At the point Q the voltage at the terminal B again drops to zero. This immediately turns OFF the transistor T1. However, the transistor T2 does not turn ON until the capacitor C1 has been charged up to the breakdown voltage of the zener diode Z2 via the resistors R2 and R3. This takes a time a, but once it has been achieved, transistor T3 is switched OFF with negligible delay switching the transistor T4 ON and the power Darlington pair PD OFF at the time S.

Thus, the transistor T2 switches from OFF to ON and the terminal B is disconnected from the earth line at a time a after the end of the primary voltage pulse at the terminal B.

As the speed of the engine is increased, the pulses get closer together, as shown in FIG. 2B. The limiting situation is shown in FIG. 2B, where the time t from the end of one pulse to the beginning of the next is less than the time a, and the transistor T1 is switched ON by the leading edge E of the pulse before capacitor C1 has had time to charge up and switch transistor T2 from OFF to ON. At the end of the pulse, transistor T1 is switched OFF and the capacitor C1 begins to charge up, but again it is discharged before it can switch ON the transistor T2. Thus, the transistor T2 is never turned on, and the terminal B is always connected to ground via the zener diode Z4, and the power Darlington pair PD which is conductive.

Thus, whenever the engine speed rises above a value set by the delay time a (in turn set by the variable resistor R3) ignition is prevented.

The zener diode Z1 and the resistor R5 provide a stabilized supply to the time constant circuits so that the periods a and b may be adjusted independent of battery voltage.

Figure 3:
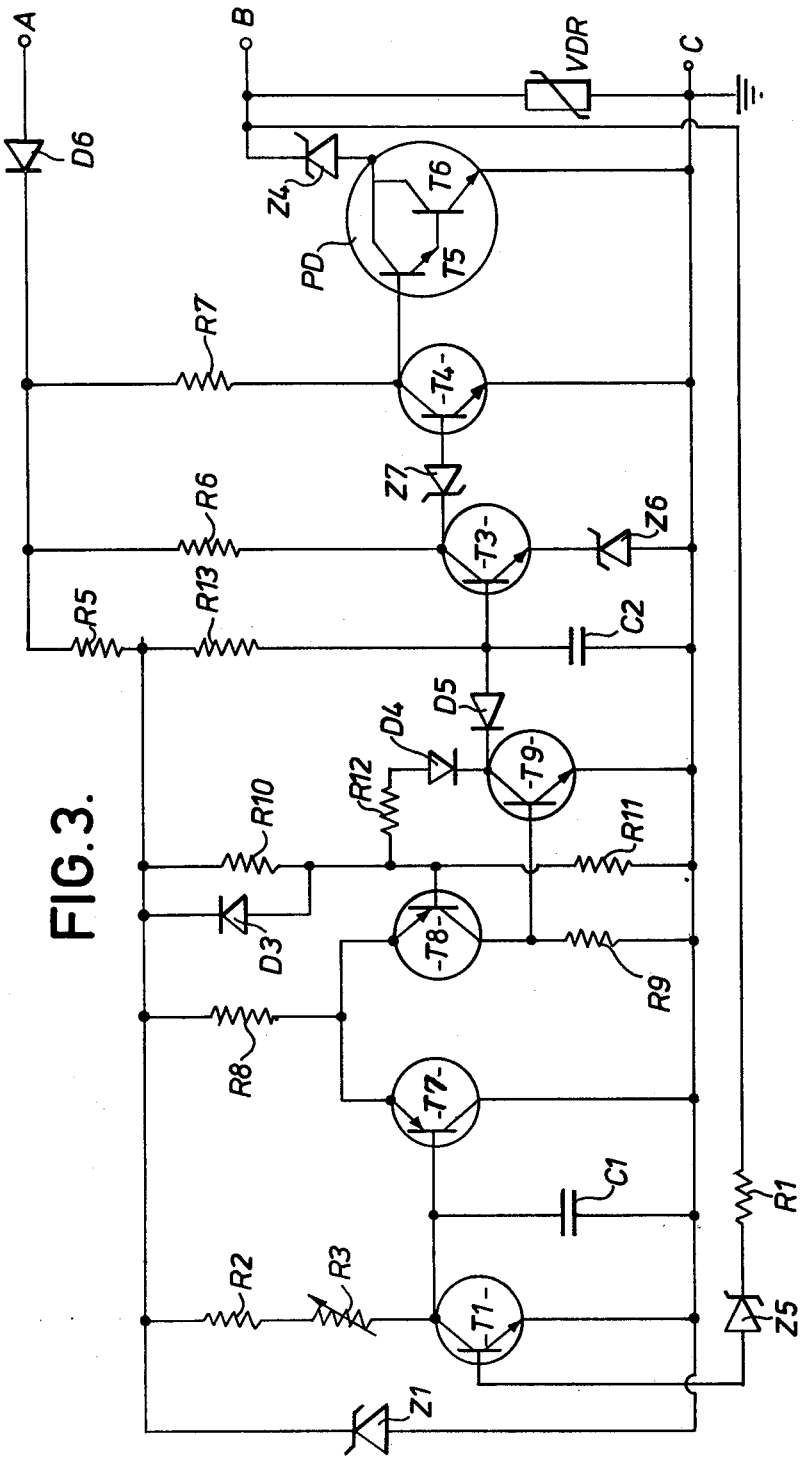
FIG. 3 is a circuit diagram of a second embodiment of a revolution limiter for an internal combustion engine having spark ignition.

Referring now to the second embodiment disclosed in FIG. 3, like reference numerals are used for identical components used in the first embodiment shown in FIG. 1. The ignition coil and speed detecting and semiconductor switch arrangement have been omitted in FIG. 3.

The principal difference of this second embodiment resides in the replacement of the transistor T2 by a Schmitt trigger comprising transistors T7, T8 and T9, associated resistors R8 to R12 and diodes D3 to D5.

Other modifications to the circuit include: (a) A voltage dependent resistor VDR connected across the series combination of the zener diode Z4 and the power Darlington pair PD, which prevents induced voltage from the production of the spark and any other high voltage transients from damaging the circuit.

(b) A diode D6 connected in the positive line from the battery which protects the circuit against the battery being accidentally connected the wrong way around.

(c) Zener diodes Z6 and Z7 respectively connected between the ground line and the emitter electrode of the transistor T3; and the base electrode of the transistor T4 and the collector electrode of the transistor T3. The provision of the zener diode Z6 increases the voltage switching point of the circuit following the Schmitt trigger to about 4 volts. The zener diode 27 prevents the transistor T4 from being turned on when the transistor T3 is conducting. The two zener diodes provide a better stability of the circuit against changes in temperature.

(d) A zener diode Z5 which replaces the diodes D1 and D2. The provision of the zener diode Z5 has the effect of increasing the operating point of the transistor T1 from 1.5 volts in the case of the diodes D1 and D2 to 4.7 volts, which prevents the transistor T1 from partially turning on and thus removing charging current from the capacitor C1.

The Schmitt trigger includes a pair of PNP transistors T7 and T8 connected in long tailed pair configuration having commoned emitter electrodes connected to the positive line through the resistor R8. The collector electrodes of these two transistors are respectively connected directly to ground and to ground through the resistor R9. The base electrode of the transistor T7 is connected to the collector electrode of the transistor T1. The base electrode of the transistor T8 is connected to the collector electrode of the transistor T9 through the resistor R12 and the diode D4. The base electrode of the transistor T8 is connected to the positive line by a parallel circuit consisting of the resistor R10 and the diode D3 and to ground via the resistor R11. The diode D3 provides a path for freak transients. The base electrode of the transistor T9 is connected to the collector electrode of the transistor T8 and the emitter electrode of the transistor T9 is connected directly to ground. The diode D5 is connected between the base electrode of the transistor T3 and the collector electrode of the transistor T9. The base electrode of the transistor T3 is connected to the positive line through a resistor R13 and the capacitor C2 is connected between the base electrode of the transistor T3 and ground.

The Schmitt trigger comprising transistors T7 to T9 in place of the transistor T2 gives a more precise voltage switching point. The reason for this is that the threshold voltage at the base electrode of the transistor T7 needed to trigger the Schmitt trigger is determined by the voltage at the base electrode of the transistor T8 which is itself determined by the ratio of the resistance values of the resistors R10 and R11. The operation of the embodiment of FIG. 3 is substantially equivalent to that of the first embodiment and the waveforms shown in FIG. 2 are substantially identical, except that the third waveform will have been taken at the collector electrode of the transistor T9.

The revolution limiter described with reference to FIGS. 1 and 3 can either be used with a conventional contact breaker ignition system, or with various types of electronic ignition system, whether magnetic or opto-electronic. In particular, they may be used with any one of the opto-electronic systems as disclosed in U.S. Pat. Nos. 3,605,712; 3,710,131; 3,896,776; and 3,981,282 and U.S. application Ser. Nos. 652,748 and 655,138.

What I claim and desire to secure by Letters Patent is:

1. A device for limiting the speed of revolution of an internal combustion engine having an ignition coil providing spark ignition and including a primary winding having first and second terminals one of which is connected to a positive supply line and the other of which is remote from the positive supply line, said device comprising: revolution detecting means for detecting the number of revolutions of the engine per unit time; a semiconductor breakdown device which will break down above a given threshold voltage; a semiconductor switch connected in series with said semiconductor device between that terminal of the primary winding of the ignition coil which is remote from the positive supply line and ground; and biasing means responsive to said revolution detecting means for biasing the semiconductor switch so that said switch switches from a first state wherein said switch is alternately conductive and non-conductive for speeds below a predetermined limit to a second state in which the semiconductor switch is biased to be continuously conductive for speeds above the predetermined limit so as to provide limiting of the voltage developed in the primary winding of the ignition coil to a voltage equal to the breakdown voltage of said semiconductor device when the speed exceeds said limit, the non-conductive mode of said switch in said first state providing normal ignition operation speeds below said limit.

2. A device according to claim 1, wherein a voltage dependent resistor is connected across the series combination of the semiconductor breakdown device and the semiconductor switch.

3. A device according to claim 1, wherein a diode is connected in the positive line for the device to prevent a reverse battery connection from damaging any of the semiconductor elements.

4. A device according to claim 1, wherein said semiconductor breakdown device comprises a zener diode and said semiconductor switch comprises a power Darlington pair.

5. A device according to claim 1, wherein the biasing means comprises a first transistor having an emitter, base and collector and associated storage capacitor connected in parallel with the collector-emitter path of the transistor; a Schmitt trigger having a pair of transistors coupled in long tailed pair arrangement, said Schmitt trigger being connected to the first transistor and having an output; a second storage capacitor associated with the output of the Schmitt trigger; and a plurality of inverse switching transistors coupled between the Schmitt trigger and a control electrode of the semiconductor switch, the base electrode of the first transistor being connected to said terminal of the primary winding of the ignition coil through a zener diode and resistor.

6. A device for limiting the speed of revolution of an internal combustion engine having an ignition coil providing spark ignition, and comprising primary winding having a first and second terminals, said device including engine speed detection means comprising a first transistor having emitter, base and collector terminals one of which is an output and associated storage capacitor connected in parallel with the collector-emitter path of the transistor, a Schmitt trigger having a pair of transistors connected in long tailed pair configuration, said Schmitt trigger having an output and being connected to the output of said first transistor, a second storage capacitor connected across the output of the Schmitt trigger, and a plurality of inverse switching transistors connected in cascade, the first of said plurality of inverse switching transistors being connected to the output from the Schmitt trigger; a zener diode; a power Darlington pair connected in series with said zener diode between one terminal of the primary widing of the ignition coil and ground; said engine speed detection means being connected to bias the power Darlington pair from a first state wherein the power Darlington pair is alternately conductive and non-conductive and the non-conductive periods permit normal ignition operation at speeds below a predetermined limit, to a second state in which the power Darlington pair is biased to be continuously conductive and thus conduct current when the voltage present at said one terminal of the primary winding in excess of the zener voltage so as to limit the voltage to the zener voltage for engine speeds above said limit.

7. A device according to claim 6, wherein said plurality of transistors comprises a pair of transistors each having an emitter base and collector, and wherein a first zener diode is connected in the emitter circuit of the first transistor and a second zener diode is connected between the base electrode of the second transistor and the collector electrode of the first transistor.

* * * * *